US010831737B2

(12) United States Patent
Wang et al.

(10) Patent No.: US 10,831,737 B2
(45) Date of Patent: Nov. 10, 2020

(54) METHOD AND DEVICE FOR PARTITIONING ASSOCIATION TABLE IN DISTRIBUTED DATABASE

(71) Applicant: Huawei Technologies Co., Ltd., Shenzhen (CN)

(72) Inventors: Tieying Wang, Hangzhou (CN); Zhe Liu, Hangzhou (CN); Ke Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 15/814,141

(22) Filed: Nov. 15, 2017

(65) Prior Publication Data
US 2018/0075077 A1 Mar. 15, 2018

Related U.S. Application Data

(63) Continuation of application No. PCT/CN2015/080444, filed on May 31, 2015.

(51) Int. Cl.
*G06F 16/00* (2019.01)
*G06F 16/22* (2019.01)
(Continued)

(52) U.S. Cl.
CPC ...... *G06F 16/2282* (2019.01); *G06F 12/1009* (2013.01); *G06F 12/1027* (2013.01);
(Continued)

(58) Field of Classification Search
CPC .. G06F 16/27; G06F 16/2282; G06F 12/1009; G06F 12/1027; G06F 2212/65; G06F 2212/68; G06F 16/278
(Continued)

(56) References Cited

U.S. PATENT DOCUMENTS 7,818,349 B2 10/2010 Frost
9,195,701 B2 * 11/2015 Jagtiani ............... G06F 16/2282
(Continued)

FOREIGN PATENT DOCUMENTS

CN 101916261 A 12/2010
CN 104462430 A 3/2015
WO 2014067449 A1 5/2014

OTHER PUBLICATIONS

Machine Translation and Abstract of Chinese Publication No. CN104462430, Mar. 25, 2015, 15 pages.
(Continued)

*Primary Examiner* — Vincent F Boccio
(74) *Attorney, Agent, or Firm* — Conley Rose, P.C.

(57) ABSTRACT

A method for partitioning an association table in a distributed database, where a manager determines a first data table in data tables requiring partition and generates a colocation partition (CP) table set of the first data table, the CP table set of the first data table includes the first data table and at least one CP table of the first data table, and a CP table of the first data table includes a data table whose partition key includes a subset of a partition key of the first data table. The manager partitions the first data table according to the partition key and partitions each CP table in the CP table set, a partition range of a partition key of each CP table is the same as a partition range of a corresponding partition key in the first data table.

20 Claims, 13 Drawing Sheets

(51) Int. Cl.
*G06F 16/27* (2019.01)
*G06F 12/1009* (2016.01)
*G06F 12/1027* (2016.01)

(52) U.S. Cl.
CPC .......... *G06F 16/27* (2019.01); *G06F 2212/65* (2013.01); *G06F 2212/68* (2013.01)

(58) Field of Classification Search
USPC ........................................................ 707/741
See application file for complete search history.

(56) References Cited

U.S. PATENT DOCUMENTS

| | | | |
|---|---|---|---|
| 2005/0187977 A1* | 8/2005 | Frost | G06F 16/278 |
| 2009/0171885 A1 | 7/2009 | Silberstein et al. | |
| 2012/0109888 A1 | 5/2012 | Zhang et al. | |
| 2014/0122484 A1* | 5/2014 | Jagtiani | G06F 16/2282 |
| | | | 707/737 |
| 2015/0293896 A1* | 10/2015 | Runkis | H04L 63/168 |
| | | | 707/755 |

OTHER PUBLICATIONS

Foreign Communication From A Counterpart Application, Chinese Application No. 201580001222.8, Chinese Search Report dated Mar. 4, 2019, 2 pages.

Foreign Communication From A Counterpart Application, Chinese Application No. 201580001222.8, Chinese Office Action dated Mar. 11, 2019, 3 pages.

Escriva, R., et al., "HyperDex: A Distributed, Searchable Key-Value Store," SIGCOMM, Aug. 13-17, 2012, 12 pages.

Foreign Communication From A Counterpart Application, PCT Application No. PCT/CN2015/080444, English Translation of International Search Report dated Mar. 4, 2016, 2 pages.

Foreign Communication From A Counterpart Application, PCT Application No. PCT/CN2015/080444, English Translation of Written Opinion dated Mar. 4, 2016, 6 pages.

* cited by examiner

| LineItem table | Part table | Supp table | Part_Supp table |
|---|---|---|---|
| (L_0, L_1] (P_0, P_1] (S_0, S_1]<br>(L_0, L_1] (P_0, P_1] (S_1, S_2] | (P_0, P_1]<br>(P_0, P_1] | (S_0, S_1]<br>(S_1, S_2] | (P_0, P_1] (S_0, S_1]<br>(P_0, P_1] (S_1, S_2] |
| (L_0, L_1] (P_1, P_2] (S_0, S_1]<br>(L_0, L_1] (P_1, P_2] (S_1, S_2] | (P_1, P_2]<br>(P_1, P_2] | (S_0, S_1]<br>(S_1, S_2] | (P_1, P_2] (S_0, S_1]<br>(P_1, P_2] (S_1, S_2] |
| (L_0, L_1] (P_2, P_3] (S_0, S_1]<br>(L_0, L_1] (P_2, P_3] (S_1, S_2] | (P_2, P_3]<br>(P_2, P_3] | (S_0, S_1]<br>(S_1, S_2] | (P_2, P_3] (S_0, S_1]<br>(P_2, P_3] (S_1, S_2] |
| (L_0, L_1] (P_3, P_4] (S_0, S_1]<br>(L_0, L_1] (P_3, P_4] (S_1, S_2] | (P_3, P_4]<br>(P_3, P_4] | (S_0, S_1]<br>(S_1, S_2] | (P_3, P_4] (S_0, S_1]<br>(P_3, P_4] (S_1, S_2] |
| (L_0, L_1] (P_4, P_5] (S_0, S_1]<br>(L_0, L_1] (P_4, P_5] (S_1, S_2] | (P_4, P_5]<br>(P_4, P_5] | (S_0, S_1]<br>(S_1, S_2] | (P_4, P_5] (S_0, S_1]<br>(P_4, P_5] (S_1, S_2] |
| (L_1, L_2] (P_0, P_1] (S_0, S_1]<br>(L_1, L_2] (P_0, P_1] (S_1, S_2] | (P_0, P_1]<br>(P_0, P_1] | (S_0, S_1]<br>(S_1, S_2] | (P_0, P_1] (S_0, S_1]<br>(P_0, P_1] (S_1, S_2] |
| (L_1, L_2] (P_1, P_2] (S_0, S_1]<br>(L_1, L_2] (P_1, P_2] (S_1, S_2] | (P_1, P_2]<br>(P_1, P_2] | (S_0, S_1]<br>(S_1, S_2] | (P_1, P_2] (S_0, S_1]<br>(P_1, P_2] (S_1, S_2] |
| (L_1, L_2] (P_2, P_3] (S_0, S_1]<br>(L_1, L_2] (P_2, P_3] (S_1, S_2] | (P_2, P_3]<br>(P_2, P_3] | (S_0, S_1]<br>(S_1, S_2] | (P_2, P_3] (S_0, S_1]<br>(P_2, P_3] (S_1, S_2] |
| (L_1, L_2] (P_3, P_4] (S_0, S_1]<br>(L_1, L_2] (P_3, P_4] (S_1, S_2] | (P_3, P_4]<br>(P_3, P_4] | (S_0, S_1]<br>(S_1, S_2] | (P_3, P_4] (S_0, S_1]<br>(P_3, P_4] (S_1, S_2] |
| (L_1, L_2] (P_4, P_5] (S_0, S_1]<br>(L_1, L_2] (P_4, P_5] (S_1, S_2] | (P_4, P_5]<br>(P_4, P_5] | (S_0, S_1]<br>(S_1, S_2] | (P_4, P_5] (S_0, S_1]<br>(P_4, P_5] (S_1, S_2] |
| (L_2, L_3] (P_0, P_1] (S_0, S_1]<br>(L_2, L_3] (P_0, P_1] (S_1, S_2] | (P_0, P_1]<br>(P_0, P_1] | (S_0, S_1]<br>(S_1, S_2] | (P_0, P_1] (S_0, S_1]<br>(P_0, P_1] (S_1, S_2] |
| (L_2, L_3] (P_1, P_2] (S_0, S_1]<br>(L_2, L_3] (P_1, P_2] (S_1, S_2] | (P_1, P_2]<br>(P_1, P_2] | (S_0, S_1]<br>(S_1, S_2] | (P_1, P_2] (S_0, S_1]<br>(P_1, P_2] (S_1, S_2] |
| (L_2, L_3] (P_2, P_3] (S_0, S_1]<br>(L_2, L_3] (P_2, P_3] (S_1, S_2] | (P_2, P_3]<br>(P_2, P_3] | (S_0, S_1]<br>(S_1, S_2] | (P_2, P_3] (S_0, S_1]<br>(P_2, P_3] (S_1, S_2] |
| (L_2, L_3] (P_3, P_4] (S_0, S_1]<br>(L_2, L_3] (P_3, P_4] (S_1, S_2] | (P_3, P_4]<br>(P_3, P_4] | (S_0, S_1]<br>(S_1, S_2] | (P_3, P_4] (S_0, S_1]<br>(P_3, P_4] (S_1, S_2] |
| (L_2, L_3] (P_4, P_5] (S_0, S_1]<br>(L_2, L_3] (P_4, P_5] (S_1, S_2] | (P_4, P_5]<br>(P_4, P_5] | (S_0, S_1]<br>(S_1, S_2] | (P_4, P_5] (S_0, S_1]<br>(P_4, P_5] (S_1, S_2] |

Partition result of a CP table set of a LineItem table

CONT.
FROM

| Order table | Customer table |
|---|---|
| (O_0, O_1] (C_0, C_1]<br>(O_0, O_1] (C_1, C_2]<br>(O_0, O_1] (C_2, C_3]<br>(O_0, O_1] (C_3, C_4]<br>(O_0, O_1] (C_4, C_5] | (C_0, C_1]<br>(C_1, C_2]<br>(C_2, C_3]<br>(C_3, C_4]<br>(C_4, C_5] |
| (O_1, O_2] (C_0, C_1]<br>(O_1, O_2] (C_1, C_2]<br>(O_1, O_2] (C_2, C_3]<br>(O_1, O_2] (C_3, C_4]<br>(O_1, O_2] (C_4, C_5] | (C_0, C_1]<br>(C_1, C_2]<br>(C_2, C_3]<br>(C_3, C_4]<br>(C_4, C_5] |
| (O_2, O_3] (C_0, C_1]<br>(O_2, O_3] (C_1, C_2]<br>(O_2, O_3] (C_2, C_3]<br>(O_2, O_3] (C_3, C_4]<br>(O_2, O_3] (C_4, C_5] | (C_0, C_1]<br>(C_1, C_2]<br>(C_2, C_3]<br>(C_3, C_4]<br>(C_4, C_5] |

Partition result of a CP table set of an Order table

|  | Table 1 | Table 2 | Table 3 |
|---|---|---|---|
| Node 1 | (0, 10] (0, 10] (0, 100] | (0, 10] | (0, 10] |
| Node 2 | (0, 10] (0, 10] (100, 200] | (0, 10] | (100, 200] |
| Node 3 | (0, 10] (10, 20] (0, 100] | (10, 20] | (0, 100] |
| Node 4 | (0, 10] (10, 20] (100, 200] | (10, 20] | (100, 200] |
| Node 5 | (10, 20] (0, 10] (0, 100] | (0, 10] | (0, 100] |
| Node 6 | (10, 20] (0, 10] (100, 200] | (0, 10] | (100, 200] |
| Node 7 | (10, 20] (10, 20] (0, 100] | (10, 20] | (0, 100] |
| Node 8 | (10, 20] (10, 20] (100, 200] | (10, 20] | (100, 200] |

TO FIG. 8B — Table 3 on a node 2 is overloaded

TO FIG. 8B — Table 1 on a node 2 is overloaded, and there is a relatively large amount of data in Table 2

Schematic diagram of node load balancing

FIG. 8A

|  | Table 1 | Table 2 | Table 3 |
|---|---|---|---|
| Node 1 | (0, 10] (0, 10] (0, 100] | (0, 10] | (0, 100] |
| Node 2 | (0, 10] (0, 10] (100, 150] | (0, 10] | (100, 150] |
| Node 9 | (0, 10] (0, 10] (150, 200] | (0, 10] | (150, 200] |
| Node 3 | (0, 10] (10, 20] (0, 100] | (10, 20] | (0, 100] |
| Node 4 | (0, 10] (10, 20] (100, 200] | (10, 20] | (100, 200] |
| Node 5 | (10, 20] (0, 10] (0, 100] | (0, 10] | (0, 100] |
| Node 6 | (10, 20] (0, 10] (100, 200] | (0, 10] | (100, 200] |
| Node 7 | (10, 20] (10, 20] (0, 100] | (10, 20] | (0, 100] |
| Node 8 | (10, 20] (10, 20] (100, 200] | (10, 20] | (100, 200] |

CONT. FROM FIG. 8A

|  | Table 1 | Table 2 | Table 3 |
|---|---|---|---|
| Node 1 | (0, 10] (0, 10] (0, 100] | (0, 10] | (0, 100] |
| Node 2 | (0, 10] (0, 5] (100, 200] | (0, 5] | (100, 200] |
| Node 9 | (0, 10] (5, 10] (100, 200] | (5, 10] | (100, 200] |
| Node 3 | (0, 10] (10, 20] (0, 100] | (10, 20] | (0, 100] |
| Node 4 | (0, 10] (10, 20] (100, 200] | (10, 20] | (100, 200] |
| Node 5 | (10, 20] (0, 10] (0, 100] | (0, 10] | (0, 100] |
| Node 6 | (10, 20] (0, 10] (100, 200] | (0, 10] | (100, 200] |
| Node 7 | (10, 20] (10, 20] (0, 100] | (10, 20] | (0, 100] |
| Node 8 | (10, 20] (10, 20] (100, 200] | (10, 20] | (100, 200] |

CONT. FROM FIG. 8A

FIG. 8B

METHOD AND DEVICE FOR PARTITIONING ASSOCIATION TABLE IN DISTRIBUTED DATABASE

CROSS-REFERENCE TO RELATED APPLICATIONS

This application is a continuation of International Patent Application No. PCT/CN2015/080444 filed on May 31, 2015, which is hereby incorporated by reference in its entirety.

TECHNICAL FIELD

Embodiments of the present disclosure relate to the database field, and in particular, to a method and a device for partitioning an association table in a distributed database.

BACKGROUND

Mass data is a challenge to a conventional distributed database management system (DDBMS). Disclosure of a distributed data storage system BIGTABLE idea designed by GOOGLE Incorporated brings successive emergence of a large quantity of Not Only structured query language (SQL) (NOSQL) systems. As a data management system that is mainly oriented to a World Wide Web service, because there is no complex table relationship, the NOSQL may resolve most data management problems based on a key-value data model. Even for tables having a management relationship, the NOSQL places multiple relationship tables into a larger table by establishing a Schema model of a nested data model. However, a data model of this type increases data redundancy, and the nested data model severely affects querying efficiency of on-line analytical processing (OLAP) for data of an analytical service.

The DDBMS, also referred to as a distributed database, has multiple nodes. Each node maintains and manages a part of data. One part of data (referred to as active data) provides a service, and another part of data (referred to as backup data) is used as a backup and does not provide a service. The nodes may be referred to as data management nodes or data nodes. A union set of active data on all nodes is complete data of a database, and active data of tables on all nodes does not have an intersection set. To ensure the condition above, after a database administrator (DBA) creates a table, the database management system needs to perform partition processing on the table, and then allocates each partition range obtained by means of partition to each node for management. In a service scenario of multiple-table management, a partition key needs to be established for each table, and each range obtained by means of partition is allocated to each node for management. Partition and allocation manners affect the querying efficiency of the OLAP. For the distributed database based on mass data, during an OLAP operation, a computing node needs to obtain computation data from another node, thereby causing an excessively long system delay, and resulting in overall performance deterioration of the entire system.

In other approaches, in all methods for partitioning an association table in a distributed database such as a HADOOP database (HBase) or a distributed key-value database (HyperDex), during an OLAP operation, batch data needs to be obtained from multiple nodes, and global matching of a dimension table is involved during a multiple-table Join operation, thereby causing performance deterioration of the entire system.

SUMMARY

In view of this, embodiments of the present disclosure provide a method and a device for partitioning an association table in a distributed database in order to reduce cases of obtaining a large amount of data from multiple nodes and global matching of a dimension table during an OLAP operation, thereby improving performance of an entire system.

According to a first aspect, an embodiment of the present disclosure provides a method for partitioning an association table in a distributed database, including determining a first data table in data tables requiring partition, where a partition key of the first data table is not a foreign key of any second data table, and the second data table is a data table in the data tables requiring partition other than the first data table, generating a colocation partition (CP) table set of the first data table, where the CP table set of the first data table includes the first data table and at least one CP table of the first data table, and a CP table of the first data table is a data table whose partition key is a subset of the partition key of the first data table, partitioning the first data table according to each partition key of the first data table, and partitioning each CP table that is of the first data table and that is in the CP table set, where a partition range of a partition key, of each CP table that is of the first data table and that is in the CP table set, associated with the first data table is the same as a partition range of a corresponding partition key in the first data table.

In a first possible implementation manner of the first aspect, generating a CP table set of the first data table includes obtaining a dimension table of the first data table, determining whether the dimension table of the first data table is a CP table of the first data table, adding the dimension table of the first data table to the CP table set of the first data table if the dimension table of the first data table is a CP table of the first data table, iteratively determining whether a dimension table of a CP table that is of the first data table and that is added to the CP table set of the first data table is a CP table of the first data table, and adding a data table that is confirmed to be a CP table of the first data table to the CP table set of the first data table, until all CP tables of the first data table are found.

With reference to the first aspect or the first possible implementation manner of the first aspect, in a second possible implementation manner, the method further includes receiving a load balancing request, where the load balancing request indicates that load balancing needs to be performed on a first node, determining, on the first node, a CP table set on which load balancing is to be performed, and determining, in the CP table set on which load balancing is determined to be performed, a data table on which load adjustment is to be performed, selecting, from the data table on which load balancing is determined to be performed, a partition key for partition range adjustment, and performing, on all data tables that are in the CP table set on which load balancing is determined to be performed and that include the partition key selected for partition range adjustment and according to the partition key selected for partition range adjustment, partition range adjustment that is the same as that of the data table of the partition key selected for partition range adjustment.

With reference to the second possible implementation manner of the first aspect, in a third possible implementation manner, determining, on the first node, a CP table set on which load balancing is to be performed includes determining, according to a data table record quantity dimension or an occupied space dimension, a CP table set that is on the first node and on which load balancing needs to be performed.

According to a second aspect, an embodiment of the present disclosure provides a database manager, including a determining unit configured to determine a first data table in data tables requiring partition, where a partition key of the first data table is not a foreign key of any second data table, and the second data table is a data table in the data tables requiring partition other than the first data table, a CP table set generation unit configured to generate a CP table set of the first data table, where the CP table set of the first data table includes the first data table and at least one CP table of the first data table, and a CP table of the first data table is a data table whose partition key is a subset of the partition key of the first data table, and a partitioning unit configured to partition the first data table according to each partition key of the first data table, and partition each CP table that is of the first data table and that is in the CP table set, where a partition range of a partition key, of each CP table that is of the first data table and that is in the CP table set, associated with the first data table is the same as a partition range of a corresponding partition key in the first data table.

In a first possible implementation manner of the second aspect, the CP table set generation unit is further configured to obtain a dimension table of the first data table, determine whether the dimension table of the first data table is a CP table of the first data table, add the dimension table of the first data table to the CP table set of the first data table if the dimension table of the first data table is a CP table of the first data table, iteratively determine whether a dimension table of a CP table that is of the first data table and that is added to the CP table set of the first data table is a CP table of the first data table, and add a data table that is confirmed to be a CP table of the first data table to the CP table set of the first data table, until all CP tables of the first data table are found.

With reference to the second aspect or the first possible implementation manner of the second aspect, in a second possible implementation manner, the database manager further includes a load balancing unit configured to receive a load balancing request, where the load balancing request indicates that load balancing needs to be performed on a first node, determine, on the first node, a CP table set on which load balancing is to be performed, select, from the data table on which load balancing is determined to be performed, a partition key for partition range adjustment, and perform, on all data tables that are in the CP table set on which load balancing is determined to be performed and that include the partition key selected for partition range adjustment and according to the partition key selected for partition range adjustment, partition range adjustment that is the same as that of the data table of the partition key selected for partition range adjustment.

With reference to the second aspect or the first possible implementation manner of the second aspect, in a third possible implementation manner, the database manager further includes a load balancing unit, and the load balancing unit includes a receiving module configured to receive a load balancing request, where the load balancing request indicates that load balancing needs to be performed on a first node, and determine, on the first node, a CP table set on which load balancing is to be performed, a determining module configured to determine, in the CP table set on which load balancing is determined to be performed, a data table on which load adjustment is to be performed, and select, from the data table on which load balancing is determined to be performed, a partition key for partition range adjustment, and an adjustment module configured to perform, on all data tables that are in the CP table set on which load balancing is determined to be performed and that include the partition key selected for partition range adjustment and according to the partition key selected for partition range adjustment, partition range adjustment that is the same as that of the data table of the partition key selected for partition range adjustment.

With reference to the second or the third possible implementation manner of the second aspect, in a fourth possible implementation manner, a method for determining a CP table set on which load balancing is to be performed includes determining, according to a data table record quantity dimension or an occupied space dimension, a CP table set that is on the first node and on which load balancing needs to be performed.

According to a third aspect, an embodiment of the present disclosure further provides a database management device, including a processor, a memory, and a bus, where the memory is configured to store a computer execution instruction, and the processor and the memory are connected using the bus, where when the database management device runs, the processor reads the computer execution instruction stored in the memory in order to execute the method described in the first aspect or any one of the possible implementation manners of the first aspect.

According to the foregoing solutions, in the method for partitioning an association table in a distributed database provided in the embodiments of the present disclosure, colocation is performed on associated data in association tables, that is, partition manners of associated partition keys in the association tables are the same, and distribution is also in a one-to-one mapping. Therefore, during an OLAP operation, it is only required to obtain data from a current node or data of an associated same range from another node, with no need to obtain an entire fact table, thereby improving performance of an entire system.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 8A and FIG. 8B are a schematic diagram of node load balancing according to Embodiment 3 of the present disclosure;

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
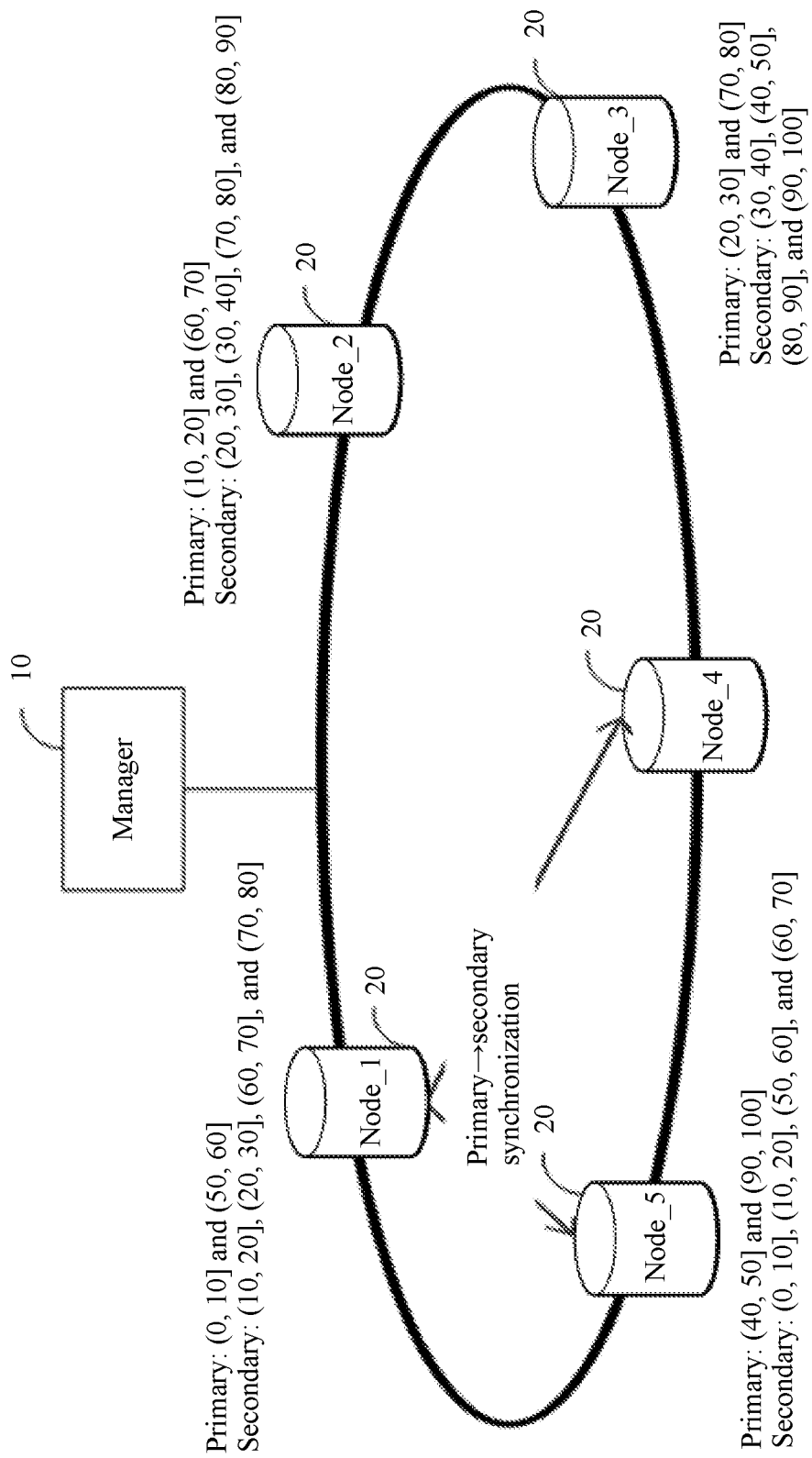
FIG. 1 is an architecture diagram of a distributed database according to an embodiment of the present disclosure.

FIG. 1 is an architecture diagram of a distributed database system according to an embodiment of the present disclosure. As shown in FIG. 1, the distributed database system includes multiple nodes 20 (designated as node_1, node_2, node_3, node_4, and node_5), a manager 10 configured to maintain and manage the database system. The manager 10 shown in FIG. 1 is independent of the multiple nodes 20. In an architecture different from that shown in FIG. 1, the manager 10 may be undertaken by a node in the distributed database system and disposed on the node in order to provide maintenance and management functions of the database system. The multiple nodes 20 and the manager 10 in the distributed database system in this embodiment of the present disclosure may be implemented by any host. The any host includes an ordinary computer, a mobile terminal, a workstation or server, a dedicated server, or the like, such as an X86 processor. This is not limited in the present disclosure. Each node of the multiple nodes 20 maintains and manages a part of data. One part of data (referred to as active data, or may be referred to as primary data) provides a service, and another part of data (referred to as backup data, or may be referred to as secondary data) is used as a backup. A union set of active data on all nodes of the multiple nodes 20 is complete data of the database. When data is being stored, partition processing needs to be performed on a table, and then each range obtained by means of partition is allocated to each node of the multiple nodes 20. As shown in FIG. 1, the primary data is stored in each node of the multiple nodes 20 according to partition, for example, primary data of ranges (0, 10] and (50, 60] are stored in the node_1, and primary data of ranges (10, 20] and (60, 70] are stored in the node_2. The active data stored in all the nodes of the multiple nodes 20 form the complete data (0, 100] of the database with no repetition. Further, each node of the multiple nodes 20 stores a part of backup data of primary data of another node. Primary data of each node in the system shown in FIG. 1 has backups stored in other two nodes, for example, primary data that is of the ranges (0, 10] and (50, 60] and that is stored in the node_1 has backups in both the node_4 and the node_5. The node_1 backs up its own primary data in the node_4 and the node_5 as backup data.

In a service scenario of distributed database multiple-table management, tables stored in the database may be classified into a fact table and a dimension table according to stored content. One fact table may be associated with multiple dimension tables. As shown in the following Table 1 and Table 2, Table 1 is a fact table, and Table 2 is one of multiple dimension tables associated with the fact table 1.

TABLE 1

| Fact table | | | | |
| --- | --- | --- | --- | --- |
| Sales region | Product code | Sales month | Sales volume | Sales amount |
| 1 | 347 | 1 | 3 | 7.95 |
| 1 | 447 | 1 | 3 | 7.32 |
| 2 | 347 | 2 | 4 | 7.95 |
| 2 | 447 | 2 | 4 | 7.32 |
| 3 | 339 | 3 | 16 | 42.70 |

TABLE 2

| Dimension table | | |
| --- | --- | --- |
| Product code | Product name | Product category |
| 347 | Mountain 100 | Bicycle |
| 339 | Long way 650 | Bicycle |
| 447 | Bicycle lock | Accessory |

The fact table is a core table in a database architecture, includes data that describes a specific event in a service (such as bank transactions or product sales), and is used to store at least one fact record. Each fact record corresponds to one row in the fact table. Each data row in the fact table in Table 1 records one sale fact record. In the example data row, the first three columns, sales region, product code, and sales month are key-value columns. The rest two columns, sales volume and sales amount are metric columns. A value in a key-value column corresponds to a fact record dimension, such as sales region, product code, sales month, product origin, and product category. A value in a metric column corresponds to subject content of the fact table, such as sales amount or sales volume. An entry in the dimension table is used to describe data in the fact table and record a feature of a fact record dimension (generally a key-value column) in the fact table. The dimension table includes data based on which a dimension is created. For example, the dimension table in Table 2 is used to describe a product code dimension in the fact table in Table 1. The dimension table may include a name column and an attribute column. For example, in Table 2, product code is a name column, and product name and product category are attribute columns. For example, in actual application, in a database system in which a bank keeps accounts of deposits, table A stores actual data, including an account, an affiliated institution number, an amount deposited, and the like, and table B stores a correspondence between an institution number and an institution name. Therefore, A is a fact table, and B is a dimension table.

A data table includes a primary key and a foreign key. The primary key is specified during table creation, and may be a value of one column or a joint value of multiple columns. The primary key is a unique identity of a row record, and has uniqueness. Any two rows in a table have different primary key values. The primary key is generally the first column in a table. The foreign key is used to connect two tables. The foreign key is a field whose type and field name in one table are the same as those of a field in another table, and is used to associate two or more tables. It may be understood that the foreign key generally refers to a primary key in another table. Generally, a foreign key of the fact table corresponds to a primary key of the dimension table. For example, if a column M in table A corresponds to a column N in table B, that is, the column M in table A and the column N in table B are corresponding to a same attribute, for example, both are corresponding to an order number, and the column M is a primary key in table A, the column N is a foreign key in table B. A key connecting two data tables is usually referred to as a join key. The fact table and the dimension table are associated using a join key. The join key is a foreign key for the fact table, and is a primary key for the dimension table. The foreign key of the fact table corresponds to the primary key of the dimension table. For example, the product code column in Table 1 is associated with the product code column in Table 2. The product code column may be referred to as a join key. The product code column in Table 1 is a foreign key of the fact table, and the product code column in Table 2 is a primary key of the dimension table.

In a distributed database, a data amount in a fact table is much larger than a data amount in a dimension table. Association query between tables is widely performed. Relative to the dimension table, data insertion and updating in the fact table is more frequently performed. Generally, the manager needs to set a partition key for each table. The partition key is a group of data columns that are in a data table and that determine a specific partition to which a data row belongs. The partition key is a determining basis for partitioning data. The manager partitions a data table using a partition key in order to obtain each range of each table after partition, and allocates each range of each table to each node for management. Hash, Order, or another partition manner may be performed on a partition key of a table. Data of each table is scattered on each node according to each range obtained by means of partition. When data processing is needed, data is aggregated on one node to perform aggregation Join computation. For a distributed database based on mass data, inter-node data reading causes an excessively long system delay, resulting in overall performance deterioration of the entire system, particularly during a Join operation of multiple tables.

Figure 2:
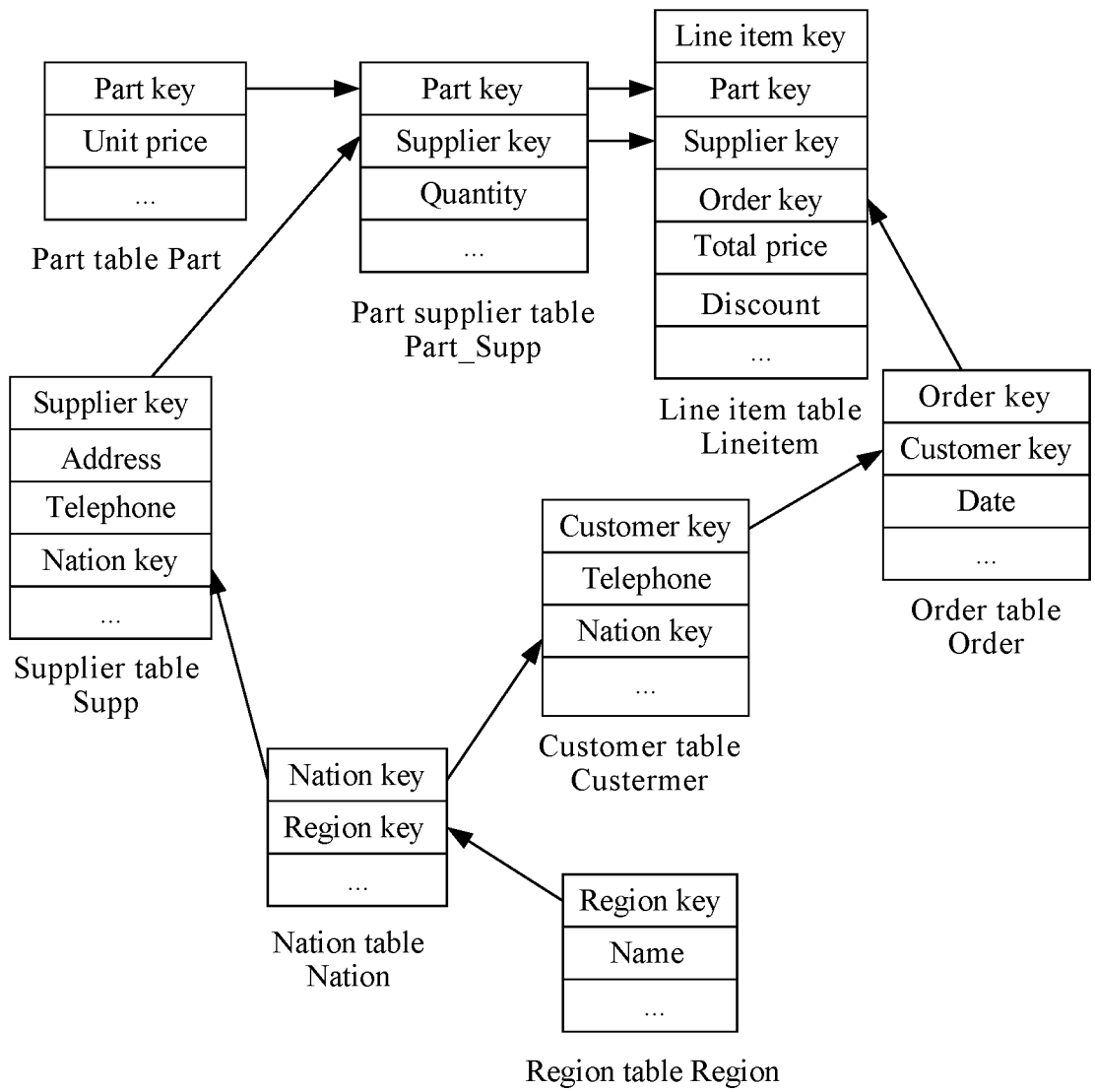
FIG. 2 is a schematic structural diagram of a distributed database according to Embodiment 1 of the present disclosure.

An embodiment of the present disclosure provides a method for partitioning an association table in a distributed database. FIG. 2 shows a schematic diagram of a database structure of a related distributed database according to an embodiment of the present disclosure. In the distributed database, the following eight association data tables are included: a line item table Lineitem, a part supplier table Part_Supp, a part table Part, a supplier table Supp, an order table Order, a customer table Customer, a nation table Nation, and a region table Region. Association relationships among the tables are shown in FIG. 2. The Lineitem table is associated with the Part_Supp table using a part key and a supplier key, and associated with the Order table using an order key. All the part key, the supplier key, and the order key herein are foreign keys of the Lineitem table. The Part_Supp table is associated with the part table using the part key, and is associated with the Supp table using the supplier key. The Order table is associated with the Customer table using a customer key. The customer key is a foreign key of the Order table. The Customer table is associated with the Nation table using a nation key. The nation key is a foreign key of the Customer table. The Nation table is associated with the Region table using a region key. The region key is a foreign key of the Nation table. Determined partition keys in all data tables are as follows: Partition keys of the Lineitem table are the order key, the part key, and the supplier key. Partition keys of the Part_Supp table are the part key and the supplier key. A partition key of the Part table is the part key. A partition key of the Supp table is the supplier key. Partition keys of the Order table are the order key and the customer key. A partition key of the Customer table is the customer key. The Nation table and the Region table have no specified partition key.

In the method for partitioning an association table in this embodiment of the present disclosure, a core data table first needs to be selected from data tables requiring partition. The data table is referred to as a first data table herein. Specific steps of determining the first data table include randomly selecting, from all data tables in the distributed database, a data table that is not partitioned, where it is assumed that all the eight data tables shown in FIG. 2 are not partitioned, and it is assumed that the Part_Supp table is selected herein, and determining that partition keys of the Part_Supp table are the part key and the supplier key, then determining whether a partition key that is a foreign key of another table exists in the partition keys of the table, setting the table as the first data table (that is, the core data table) if no partition key that is a foreign key of another table exists, or obtaining another table (the other table found herein is a fact table of the table) if a partition key that is a foreign key of the other table exists, and then determining whether the fact table can be used as the first data table, until the first data table is found. Because both the part key and the supplier key in the partition keys of the Part_Supp table are foreign keys of the Lineitem table, the fact table Lineitem table is found. Then it is continuously determined whether the Lineitem table can be used as the first data table. Because none of the order key, the part key, and the supplier key in the partition keys of the Lineitem table is a foreign key of another data table, the Lineitem table can be selected as the first data table for partition. In the foregoing method, that a data table is selected for partition may be understood as finding a fact table finally in essence. The fact table is an uppermost-level data table in association data tables requiring partition. None of partition keys of the first data table is a foreign key of another table. It may be learned that in the distributed database shown in FIG. 2, the fact table Lineitem table is finally found as the first data table regardless of a specific table from which the step of searching for the first data table is started.

Next, a CP table of the first data table needs to be found in order to establish a CP table set of the first data table. A concept of the CP table means that if all partition keys of table B are included in partition keys of table A, that is, the partition keys of table B are a subset of the partition keys of table A, table B is referred to as a CP table of table A, indicating that partition of a same range may be performed on table B according to a join key corresponding to table A. First, all partition keys of the found first data table Lineitem and data tables (that is, dimension tables associated using the partition keys of the Lineitem table as foreign keys, or the dimension tables may be referred to as association tables of the partition keys) associated with the partition keys are obtained. The partition keys of the Lineitem table are the order key, the part key, and the supplier key. The found association tables of the Lineitem table include the Part_Supp table and the Order table. Next, it is determined one by one whether these association tables are suitable for CP with the Lineitem table, that is, whether the association tables are CP tables of the Lineitem table, until determining is completed for all the association tables and a CP table set of the Lineitem table is obtained. A specific method includes selecting an association table that is of the first data table and on which determining of a CP table relationship is not performed, and obtaining all partition keys of the association table, determining whether all the partition keys of the association table are included in the partition keys of the first data table, confirming that the association table is a CP table of the first data table if all the partition keys of the association table are included in the partition keys of the first data table, adding the association table to the CP table set of the first data table, and determining whether an association table of the association table (that is, the foregoing determined CP table of the first data table) is a CP table of the first data table in a cyclic iterative manner: similarly, first determining data tables associated with the partition keys of the association table, determining, in the data tables associated with the CP table, whether all partition keys of an associated data table are included in the partition keys of the first data table, confirming that the data table is a CP table of the first data table if all partition keys of an associated data table are included in the partition keys of the first data table, and adding the data table to the CP table set of the first data table. CP tables of the first data table are continuously searched for by performing cyclic iteration according to the method, until no CP table of the first data table can be found according to a found CP table. Determining of a CP table relationship is performed on all association tables of the first data table according to the foregoing method in order to obtain the CP table set of the first data table. Therefore, the CP table set of the first data table includes the first data table and CP tables of the first data table. Partition keys of all the CP tables in the set are included in the partition keys of the first data table. When a CP table of the first data table is being searched for, if not all partition keys of an association table are included in the partition keys of the first data table, it may be confirmed that the association table is not a CP table of the first data table. Therefore, for the association tables Part_Supp table and Order table that are of the partition keys of the Lineitem table, a CP table relationship of each association table is determined one by one. The partition keys of the Part_Supp table are the part key and the supplier key, both of which are included in the partition keys of the Lineitem table. Therefore, the Part_Supp table is a CP table of the Lineitem table, and should be in the CP table set of the Lineitem table. Next, determining of a CP table relationship is performed on an association table of the Part_Supp table. The partition keys of the Part_Supp table are the part key and the supplier key. Found association tables of the partition keys of the Part_Supp table include the Part table and the Supp table. The partition key of the part table is the part key, and the partition key of the Supp table is the supplier key. Both of the partition keys are included in the partition keys of the Lineitem table. Therefore, both the Part table and the Supp table are CP tables of the Lineitem table, and should be in the CP table set of the Lineitem table. Next, association tables of the Part table and the Supp table are searched for. Neither the Part table nor the Supp table has an association table of a partition key, and therefore neither of them has a CP table of the Lineitem table. Then, for the Order table, the partition keys of the Order table are the order key and the customer key. The customer key is not included in the partition keys of the Lineitem table, and therefore the Order table is not a CP table of the Lineitem table. By performing the foregoing steps, the CP table set CP 1 of the first data table is obtained. The CP 1 includes the first data table and association tables on which CP with the first data table can be performed, that is, CP tables of the first data table. Therefore, the CP table set CP 1 of the Lineitem table includes the Lineitem table, the Part_Supp table, the Part table, and the Supp table.

Figures 3A, 3B:
FIG. 3A and FIG. 3B are a schematic diagram of a partition result of a distributed database according to Embodiment 1 of the present disclosure.

CP may be performed on the first data table and tables in the CP table set CP 1 of the first data table in the following. Specific steps include partitioning the first data table according to the partition key of the first data table, where one-dimensional partition is performed if there is one partition key, or multi-dimensional partition is performed if there are multiple partition keys, and successively partitioning a CP table that is in the CP table set of the first data table and that is not partitioned, performing partition that is the same as that of the first data table according to a partition key that is of the CP table and that is the same as that of the first data table, that is, performing same partition on the CP table and the first data table corresponding to the CP table for the same partition key. The same partition described herein indicates that ranges of the same partition key are the same during partition of two data tables. Partition of association tables in the distributed database is not completed until all data tables in the CP table set are partitioned. FIG. 3A and FIG. 3B show a partition result of a CP table set in a schematic diagram of a partition result of a distributed database according to an embodiment of the present disclosure. A quantity of dimensions of partition ranges of each data table is determined according to a quantity of partition keys of the data table. A same partition key corresponds to a same range in all data tables. For example, all the Lineitem table, the Part_Supp table, the Part table, and the Supp table in the CP table set CP 1 are partitioned with same range ranges. Three-dimensional partition is performed for the Lineitem table. An L column is partitioned into three ranges according to (L_0, L_1], (L_1, L_2], and (L_2, L_3]. A P column is partitioned into five ranges according to (P_0, P_1], (P_1, P_2], (P_2, P_3], (P_3, P_4], and (P_4, P_5]. An S column is partitioned into two ranges according to (S_0, S_1] and (S_1, S_2]. One-dimensional partition is performed for the Part table. A P column uses range ranges that are the same as those of the Lineitem table, and is partitioned into five ranges according to (P_0, P_1], (P_1, P_2], (P_2, P_3], (P_3, P_4], and (P_4, P_5]. One-dimensional partition is also performed for the Supp table. An S column uses range ranges that are the same as those of the Lineitem table, and is partitioned into two ranges according to (S_0, S_1] and (S_1, S_2]. As a CP table of the Lineitem table, the Part_Supp table undergoes two-dimensional partition and uses range ranges that are the same as those of the Lineitem table. A P column is partitioned according to (P_0, P_1], (P_1, P_2], (P_2, P_3], (P_3, P_4], and (P_4, P_5]. An S column is partitioned according to (S_0, S_1] and (S_1, S_2]. In this manner, partition manners of associated partition keys in association tables in a same CP table set are the same, that is, ranges are the same.

Next, the foregoing steps are repeatedly performed on each data table that is in the distributed database and that requires partition, until partition of all tables in the entire database is completed. Using the database shown in FIG. 2 as an example, after the foregoing partition is completed, the Order table, the Customer table, the Nation table, and the Region table are not partitioned. According to the foregoing method, the Order table is first determined as the first data table. Then a CP table set CP 2 of the Order table is established. The CP table set CP 2 of the Order table includes the Order table and the Customer table. Then, CP is performed on the tables in the CP table set CP 2 of the Order table in order to obtain a partition result of a CP table set shown in FIG. 3A and FIG. 3B. Both the Order table and the customer table are partitioned with same range ranges.

Two-dimensional partition is performed for the Order table. An O column is partitioned according to (O_0, O_1], (O_1, O_2], and (O_2, O_3]. A C column is partitioned according to (C_0, C_1], (C_1, C_2], (C_2, C_3], (C_3, C_4], and (C_4, C_5]. As a CP table of the Order table, the Customer table undergoes one-dimensional partition. A C column uses range ranges that are the same as those of the order table, and is partitioned according to (C_0, C_1], (C_1, C_2], (C_2, C_3], (C_3, C_4], and (C_4, C_5]. The Nation table and the Region table have no partition key, and do not need to be considered. Therefore, partition of the entire distributed database is completed. In addition, all data tables are partitioned in a same manner according to associated partition keys in a same CP table set, and therefore partition ranges can be also in a one-to-one mapping.

According to the method for partitioning an association table in a distributed database in this embodiment of the present disclosure, associated CP tables are found in association tables. Range manners in which CP tables are partitioned according to associated partition keys are the same, such that during an OLAP operation, it is only required to obtain data from a current node or data of an associated same range from another node, with no need to obtain an entire fact table, thereby improving performance of an entire system.

Figure 4:
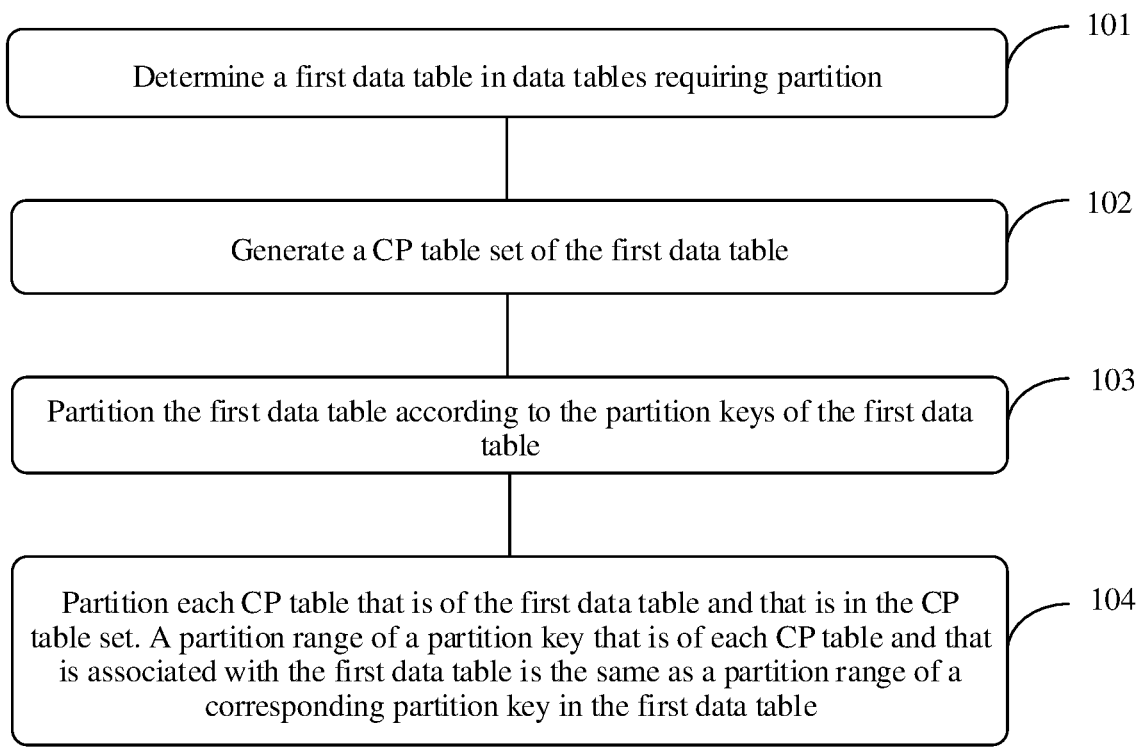
FIG. 4 is flowchart of a method for partitioning an association table in a distributed database according to Embodiment 2 of the present disclosure.

FIG. 4 is a flowchart of a method for partitioning an association table in a distributed database according to Embodiment 2 of the present disclosure. As shown in FIG. 4, the method includes the following steps.

Step 101: Determine a first data table in data tables requiring partition. The first data table herein refers to a data table meeting the following conditions. A partition key of the data table is not a foreign key of any second data table. The second data table herein refers to a data table in the data tables requiring partition other than the first data table.

In a distributed database system, partition process is generally performed by a manager in the system. Preferably, the manager may select the first data table from the system using the method of randomly selecting, from all data tables in the distributed database, a data table that is not partitioned, determining whether a partition key that is a foreign key of another table exists in partition keys of the table, setting the table as the first data table if no partition key that is a foreign key of another table exists, or otherwise, for the found another table, determining whether the other table can be used as the first data table, and repeatedly performing the process in this way until the first data table is found. It may be considered that the first data table is an uppermost-level association table in the data tables requiring partition. None of partition keys of the first data table is a foreign key of another table. Certainly, if a partition key that is a foreign key of another table exists in the data table that is not partitioned, but the other table is partitioned, the data table that is not partitioned may still be used as the first data table.

Figure 5:
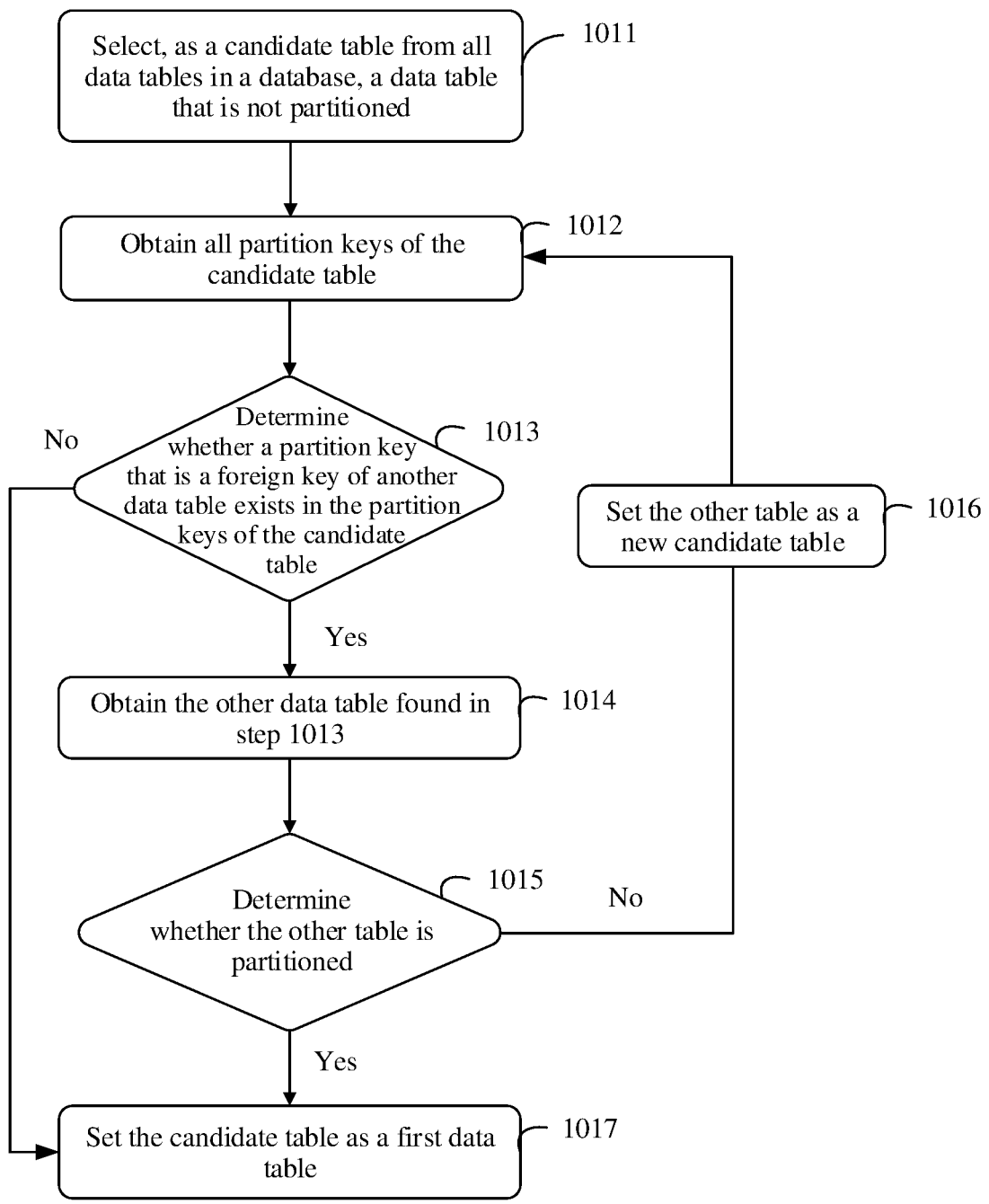
FIG. 5 is a flowchart of a method for determining a first data table according to Embodiment 2 of the present disclosure.

A method process of determining a first data table in data tables requiring partition in step 101 may be shown in FIG. 5. The method process includes the following steps.

Step 1011: Select, as a candidate table from all data tables in a database, a data table that is not partitioned. A manager randomly selects, from all the data tables, a data table that is not partitioned, and starts to determine whether the data table can be used as a first data table. The selected data table is referred to as a candidate table herein, that is, a candidate table of the first data table.

Step 1012: Obtain all partition keys of the candidate table.

Step 1013: Determine whether a partition key that is a foreign key of another data table exists in the partition keys of the candidate table, and if a partition key that is a foreign key of another data table exists in the partition keys of the candidate table, go to step 1014, or otherwise, go to step 1017.

Step 1014: Obtain the other data table found in step 1013. If a partition key that is a foreign key (or referred to as a join key) of the other data table exists in the candidate table, the other data table is obtained. It may be learned from the foregoing description about the distributed database that the other data table is actually a fact table of the candidate table. That is, the table found in step 1013 is the other data table. If a partition key of the other data table is a foreign key of the candidate table, the other data table is a fact table of the candidate table. An essence of step 1013 is to search for a fact table of the candidate table.

Step 1015: Determine whether the other table is partitioned. If the found other table is partitioned, go to step 1017, or otherwise, go to step 1016.

Step 1016: Set the other table as a new candidate table, and go to step 1012 again. If the other table is not partitioned, it indicates that the other table is a data table that requires partition and whose level is higher than that of a current candidate table. Next, set the other table as a new candidate table, go back to step 1012, and find out whether the new candidate table has an association table that is not partitioned and whose level is higher.

Step 1017: Set the candidate table as a first data table. If no partition key that is a foreign key of the other data table exists in the candidate table, or even if a partition key that is a foreign key of the other data table is found in the candidate table, but the found other data table, that is, the fact table of the candidate table, is partitioned, it may be determined that the candidate table is the to-be-found first data table. Actually, if the foregoing two conditions are met, it indicates that the candidate table is an uppermost-level association table in the data tables requiring partition. None of the partition keys of the candidate table is a foreign key of the other table, or even if a partition key that is a foreign key of the other table exists in the candidate table, all upper-level tables of the candidate table are partitioned.

The first data table can be determined by performing the foregoing method process. Certainly, before step 101, the manager in the database system receives a command entered by a system administrator using a background system to create data tables, and complete establishment of each data table and definition of a partition key of a table. First, fields in each data table need to be fully defined, and a partition key of each data table needs to be determined. Field definition of a data table and definition of a partition key may be completed using a data definition language (DDL).

Step 102: Generate a CP table set of the first data table. The CP table set of the first data table includes the first data table and at least one CP table of the first data table. A CP table of the first data table is a data table whose partition key is a subset of partition keys of the first data table, that is, partition keys of all data tables in the CP table set of the first data table are included in the partition keys of the first data table. The set includes the first data table and a data table on which CP with the first data table can be performed.

First, all partition keys of the first data table and association tables (that is, dimension tables associated using the partition keys of the first data table as foreign keys) associated with the partition keys of the first data table need to be obtained, and next, it is determined one by one whether these association tables are CP tables of the first data table. A method for determining whether an association table is a CP table of the first data table includes obtaining all partition keys of the association table, determining whether all the partition keys of the association table are included in the partition keys of the first data table, and if all the partition keys of the association table are included in the partition keys of the first data table, confirming that the association table is a CP table of the first data table, and adding the association table to the CP table set of the first data table, or otherwise, confirming that the association table is not a CP table of the first data table. For an association table that is a CP table of the first data table, such as a first CP table, it is required to refer to the method for confirming an association table of the first data table to determine whether an association table of the first CP table is a CP table of the first data table. Similarly, a specific method for determining whether an association table associated with a partition key of the first CP table is a CP table of the first data table includes obtaining all partition keys of the association table, determining whether all the partition keys of the association table are included in the partition keys of the first data table, and if all the partition keys of the association table are included in the partition keys of the first data table, confirming that the association table is a CP table of the first data table, and adding the association table to the CP table set of the first data table, or otherwise, confirming that the association table is not a CP table of the first data table. Further, determining is performed on an association table of the newly-added CP table of the first data table according to the method, and the cyclic iterative method is performed until no CP table of the first data table can be found according to a found CP table. Determining of a CP table relationship is performed on all association tables of the first data table according to the foregoing method in order to obtain a set of all CP tables of the first data table. Therefore, the CP table set of the first data table includes the first data table and CP tables of the first data table. It may be determined according to the confirmation process that partition keys of all CP tables in the set are included in the partition keys of the first data table. By performing the foregoing steps, the CP table set of the first data table is obtained. The set includes the first data table and data tables on which CP with the first data table can be performed.

Figure 6:
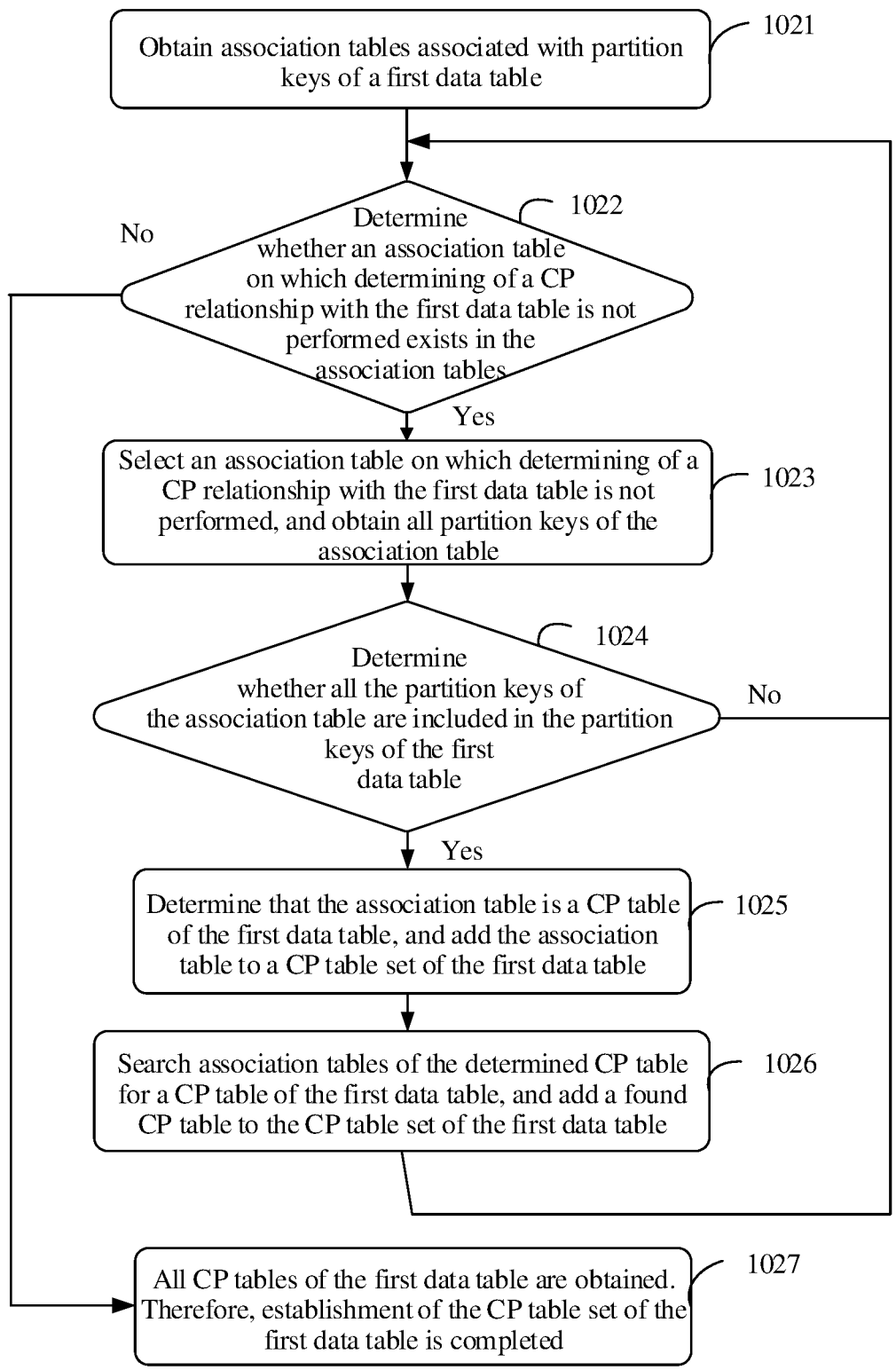
FIG. 6 is a flowchart of a method for generating a CP table set of a first data table according to Embodiment 2 of the present disclosure.

A method process for generating a CP table set of the first data table in step 102 may be shown in FIG. 6. The method process includes the following steps.

Step 1021: Obtain association tables associated with the partition keys of the first data table. First, the partition keys of the first data table are obtained. Then, the association tables associated with the partition keys are obtained according to the partition keys.

Step 1022: Determine whether an association table on which determining of a CP relationship with the first data table is not performed exists in the association tables. It is required to determine one by one whether the association tables of the first data table are suitable for CP with the first data table in order to obtain the CP table set of the first data table. The CP relationship with the first data table indicates whether the association table is a CP table of the first data table. If an association table on which determining of a CP relationship with the first data table is not performed exists, it indicates that work of generating the CP table set of the first data table is not finished, and perform step 1023, otherwise, perform step 1027.

Step 1023: Select an association table on which determining of a CP relationship with the first data table is not performed, and obtain all partition keys of the association table. An association table is randomly selected from association tables on which determining of a CP relationship with the first data table is not performed, for determining of a CP relationship. First obtain partition keys of the association table.

Step 1024: Determine whether all the partition keys of the association table are included in the partition keys of the first data table. If a partition key in the partition keys of the association table is not included in the partition keys of the first data table, it indicates that the association table is not a CP table of the first data table, go back to step 1022, continuously determine whether there is another association table on which determining of a CP relationship is not performed, and perform a subsequent step. Otherwise, perform step 1025.

Step 1025: Determine that the association table is a CP table of the first data table, and add the association table to the CP table set of the first data table. All the partition keys of the association table are included in the partition keys of the first data table, such that it is determined that the association table is a CP table of the first data table. CP with the first data table can be performed on the association table. The association table is added to the CP table set of the first data table.

Step 1026: Search association tables of the determined CP table for a CP table of the first data table, and add a found CP table to the CP table set of the first data table. A method for searching for a CP table according to the determined CP table herein is the same as the method for searching for a CP table in the association tables of the first data table, that is, the method in steps 1021 to 1026 is performed. In specific implementation, all data tables that are suitable for being added to the CP table set of the first data table are found using an iteration method. The iteration method is repeatedly invoking processes in steps 1021 to 1026 to perform recursive processing until recursion ends. During initialization, a CP table that is of the first data table and that is in association tables of the first data table is searched for, that is, the first data table is input in step 1021, and in a subsequent iteration process, an input table in step 1021 is a newly-added CP table of the first data table, until the recursion ends. For each layer of iteration, it is assumed that a CP table that is of the first data table and that is in association tables of the first CP table is searched for in this layer of iteration, where a first CP table herein may be any one of CP tables of the first data table. First, association tables associated with partition keys of the first CP table are obtained. Then it is determined one by one whether the association tables are suitable for collocation partition CP with the first data table, that is, it is determined whether all partition keys of an association table are included in the partition keys of the first data table, if all partition keys of an association table are included in the partition keys of the first data table, it is determined that the association table is a CP table of the first data table, and CP with the first data table can be performed on the association table, and add the association table to the CP table set of the first data table. In addition, for the found CP table in the association tables of the first CP table, such as a second CP table, a next layer of iteration starts to search for a CP table that is of the first data table and that is in association tables of the second CP table, until no data table that is suitable for CP with the first data table can be found in a specific layer of iteration, that is, the recursion ends.

Step 1027: All CP tables of the first data table are obtained. Therefore, establishment of the CP table set of the first data table is completed.

By performing the foregoing processes, the CP table set of the first data table is obtained. The CP tables of the first data table are included in a CP table set.

Step 103: Partition the first data table according to the partition keys of the first data table. Multi-dimensional/one-dimensional partition is performed according to a partition key status of the first data table. Further, performing multi-dimensional or one-dimensional partition is determined according to a quantity of partition keys of the first data table. If there is only one partition key, one-dimensional partition is performed. If there are N partition keys, N-dimensional partition is performed.

Step 104: Partition each CP table that is of the first data table and that is in the CP table set. A partition range of a partition key that is of each CP table and that is associated with the first data table is the same as a partition range of a corresponding partition key in the first data table. Partition that is the same as that of the first data table is performed on a data table in the CP table set of the first data table other than the first data table according to a partition key associated with the first data table. CP tables in the CP table set of the first data table are successively partitioned. Partition that is the same as that of the first data table is partitioned according to a partition key that is of a CP table and that is the same as that of the first data table, that is, same partition (whose range ranges are the same) is partitioned for the CP table and the first data table corresponding to the CP table according to the same partition key, until all data tables in the CP table set are partitioned and partition of association tables of the first data table is completed.

A method for performing partition that is the same as that of the first data table on CP tables in the CP table set of the first data table according to partition keys associated with the first data table in step 104 includes determining whether a CP table that is not partitioned exists in the CP table set of the first data table, if a CP table that is not partitioned exists, selecting, from the CP table set of the first data table, a CP table that is not partitioned, and performing partition that is the same as that of the first data table, that is, performing same partition (which has same range ranges) on the CP table according to a partition key of the CP table corresponding to the first data table, until no CP table that is not partitioned exists in the CP table set of the first data table.

Further, steps 101 to 104 above may be repeatedly performed on each data table that is in the distributed database and that is not partitioned, until partition of all tables in the entire database is completed. That is, CP is performed, according to the method described in steps 101 to 104 in FIG. 4, on other data tables requiring partition that are not in the CP table set of the first data table, until partition of the entire distributed database is completed. In this way, all data tables are partitioned in a same manner according to associated partition keys in a same CP table set, and ranges obtained by means of partition according to same partition keys in association tables are the same.

According to the method for partitioning an association table in a distributed database in this embodiment of the present disclosure, first, an associated CP table is found from data tables requiring partition, and the CP table is partitioned according to an associated partition key using a same partition range, such that during an OLAP operation, it is only required to obtain data from a current node or data of an associated same range from another node, with no need to obtain an entire fact table, thereby improving performance of an entire system.

Figure 7:
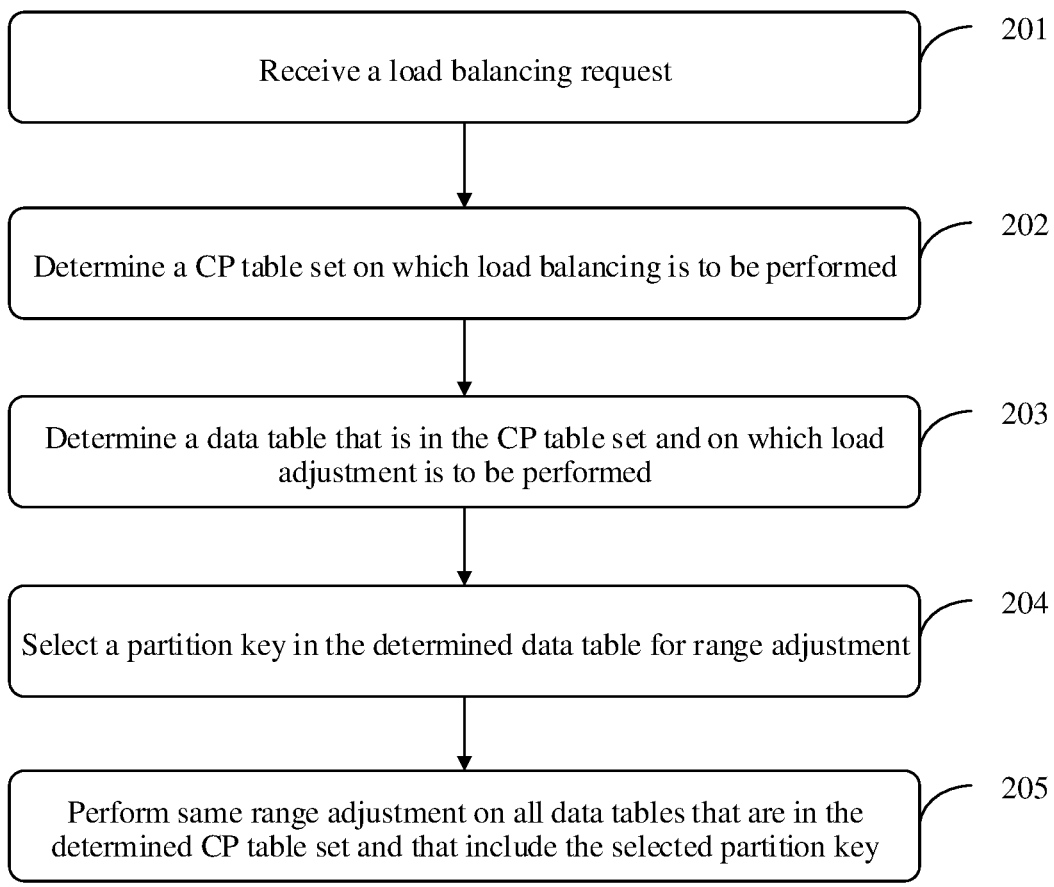
FIG. 7 is a flowchart of a load balancing method according to Embodiment 3 of the present disclosure.

After being partitioned by performing the method for partitioning an association table in a distributed database in Embodiment 2, a database system usually has a problem of load adjustment or load imbalance in a process of node joining or exiting, or in a system running process. To ensure stable system running, it is required to ensure that there is no extremely large running load difference between nodes. In this case, range division needs to be further performed on a data table that is partitioned. Embodiment 3 of the present disclosure further provides a load balancing method shown in FIG. 7. The load balancing method shown in FIG. 7 includes the following steps.

Step 201: Receive a load balancing request. A manager receives a request for performing load balancing on a node in a database. The load balancing request indicates that load balancing needs to be performed on a node, such as a first node. The load balancing request herein may be entered by a system administrator using a background system, or may be generated by a background system, a network management system, a monitoring component of the manager, or the like in the database system according to a load monitoring status of each node. Load balancing usually needs to be performed in a scenario such as adding, deleting, or the like of a node, or load imbalance occurring when a node is overloaded.

Step 202: Determine a CP table set on which load balancing is to be performed. On the first node on which load balancing is planned to be performed, a CP table set that is on the node and that requires load balancing is determined using a dimension such as a record quantity or occupied space, for example, a CP table set with relatively heavy load is used as a CP table set requiring load adjustment.

Step 203: Determine a data table that is in the CP table set and on which load adjustment is to be performed. A data table requiring load adjustment, such as a data table A with relatively heavy load, is further selected, using a dimension such as a record quantity or occupied space, from the CP table set that is determined in step 202 and on which load balancing is to be performed.

Step 204: Select a partition key in the determined data table for range adjustment. From the data table that is determined in step 203 and on which load adjustment is to be performed, a partition key is randomly selected or a partition key with relatively heavy or light load is selected for range adjustment.

Step 205: Perform same range adjustment on all data tables that are in the determined CP table set and that include the selected partition key.

Further, load balance adjustment needs to be performed on a related node according to load balance adjustment performed on the first node. For example, if the first node is overloaded, and a part of data needs to be adjusted to another node, data obtained from the first node after range adjustment is performed is adjusted to another node. The data obtained by means of adjustment may be adjusted to a node with lighter load or to a newly-added node in order to implement load balancing.

To more clearly understand the load balancing method in this embodiment of the present disclosure, FIG. 8A and FIG. 8B show a specific example of node load balancing. A table in FIG. 8A shows a result obtained by performing partition according to a method for partitioning an association table in Embodiment 2, and three data tables are listed in total. Table 1 is a fact table, and Table 2 and Table 3 are dimension tables. Table 1 is of three-dimensional partition, and Table 2 and Table 3 are of one-dimensional partition. Currently, it is assumed that a node 2 is overloaded. A manager receives a request for performing load balancing on the node 2. The manager determines that Table 1, Table 2, and Table 3 on the node 2 are a CP table set with relatively heavy load. Further, the following cases may be found. Case 1 is as follows: If Table 3 has relatively heavy load, a partition key of Table 3 is selected for range division. A range of an existing partition key of Table 3 on node 2 is (100, 200], which is divided into two ranges, (100, 150] and (150, 200]. Similarly, a data table (Table 1) that is in the CP table set and that includes the partition key of the table 3 is partitioned according to a range that is the same as that of Table 3. Therefore, as shown in FIG. 8B, the node 2 includes only data of ranges (0, 10], (0, 10], and (100, 150] in Table 1, data of a range (0, 10] in Table 2, and data of a range (100, 150] in Table 3, thereby having greatly reduced load. Data obtained by performing division on the node 2 is allocated to a node 9. The node 9 includes data of ranges (0, 10], (0, 10], and (150, 200] in Table 1, the data of the range (0, 10] in Table 2, and data of a range (150, 200] in Table 3. Certainly, the node 9 herein may be a newly-added node, or may be another existing node. Case 2 is as follows: If Table 1 on the node 2 has relatively heavy load, and there is a relatively large amount of data in Table 2, partition keys that both Table 1 and Table 2 have are considered to be selected for range division. A range of an existing partition key of Table 2 on the node 2 is (0, 10], which is divided into two ranges, (0, 5] and (5, 10]. Similarly, a data table (Table 1) that is in the CP table set and that includes the partition key of Table 2 is partitioned according to a range that is the same as that of Table 2. Therefore, as shown in FIG. 8B, the node 2 includes only data of ranges (0, 10], (0, 5], and (100, 200] in Table 1, data of a range (0, 5] in Table 2, and data of a range (100, 200] in Table 3, thereby having greatly reduced load. Data obtained by performing division on the node 2 is allocated to a node 9. The node 9 includes data of ranges (0, 10], (5, 10], and (100, 200] in Table 1, data of a range (5, 10] in Table 2, and the data of the range (100, 200] in Table 3.

According to the foregoing load adjustment method, a data table requiring load balance adjustment and a related partition key need to be determined, and partition of a same range is performed on each associated CP table still according to an associated partition key. This can ensure load balancing between nodes, such that a system can stably run. In addition, ranges of partition performed, still according to the associated partition key, on associated CP tables on all nodes that have undergone load balancing are the same. Therefore, it is ensured that during an OLAP operation, it is only required to obtain data from a current node or data of an associated same range from another node, with no need to obtain an entire fact table, thereby improving performance of an entire system.

Figure 9:
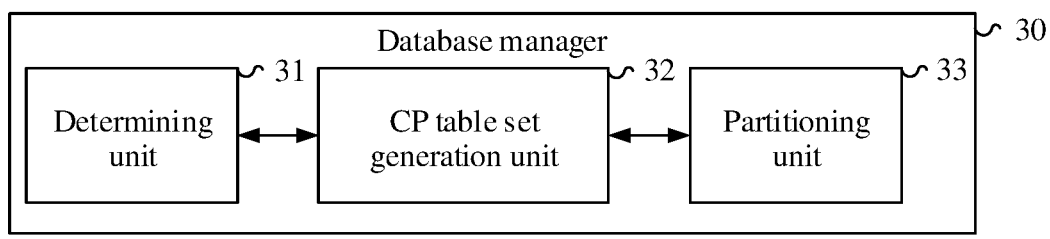
FIG. 9 is a structural diagram of a database manager according to Embodiment 4 of the present disclosure.

FIG. 9 is a structural diagram of a database manager 30 according to Embodiment 4 of the present disclosure. As shown in FIG. 9, the database manager 30 includes a determining unit 31, a CP table set generation unit 32, and a partitioning unit 33.

The determining unit 31 is configured to determine a first data table in data tables requiring partition, where a partition key of the first data table is not a foreign key of any second data table, and the second data table herein is a data table in the data tables requiring partition other than the first data table. A specific method for determining the first data table by the determining unit 31 includes randomly selecting, from all data tables in a distributed database, a data table that is not partitioned, determining whether a partition key that is a foreign key of another table exists in partition keys of the table, setting the table as the first data table if no partition key that is a foreign key of another table exists in the partition keys of the table, or otherwise, for the found other table, determining whether the other table can be used as the first data table, and repeatedly performing the processing until the first data table is found. It may be considered that the first data table is an uppermost-level association table in the data tables requiring partition. None of partition keys of the first data table is a foreign key of another table. Certainly, if a partition key that is a foreign key of another table exists in the data table that is not partitioned, but the other table is partitioned, the data table that is not partitioned may still be used as the first data table. For the specific method for determining the first data table by the determining unit 31, refer to descriptions in Embodiments 1 and 2. Details are not described herein.

The CP table set generation unit 32 is configured to generate a CP table set of the first data table, where the CP table set of the first data table includes the first data table and at least one CP table of the first data table, and a CP table of the first data table is a data table whose partition key is a subset of the partition keys of the first data table. It may be understood that partition keys of all data tables in the CP table set of the first data table are included in the partition keys of the first data table. The set includes the first data table and a data table on which CP with the first data table can be performed.

Optionally, the CP table set generation unit 32 is further configured to obtain a dimension table of the first data table, determine whether the dimension table of the first data table is a CP table of the first data table, add the dimension table of the first data table to the CP table set of the first data table if the dimension table of the first data table is a CP table of the first data table, iteratively determine whether a dimension table of a CP table that is of the first data table and that is added to the CP table set of the first data table is a CP table of the first data table, and add a data table that is confirmed to be a CP table of the first data table to the CP table set of the first data table, until all CP tables of the first data table are found. For a specific method for generating the CP table set of the first data table by the CP table set generation unit 32, refer to descriptions in Embodiments 1 and 2. Details are not described herein.

The partitioning unit 33 is configured to partition the first data table according to each partition key of the first data table, and partition each CP table that is of the first data table and that is in the CP table set, where a partition range of a partition key, of each CP table that is of the first data table and that is in the CP table set, associated with the first data table is the same as a partition range of a corresponding partition key in the first data table. Partition is performed according to a partition key, and multi-dimensional or one-dimensional partition needs to be performed according to a quantity of partition keys. If there is only one partition key, one-dimensional partition is performed. If there are N partition keys, N-dimensional partition is performed.

Preferably, the partitioning unit 33 performs partition that is the same as that of the first data table on another data table according to a partition key that is the same as that of the first data table, that is, same partition (whose range ranges are the same) is performed for a corresponding partition key that is the same as that of the first data table. The partitioning unit 33 selects, from the CP table set of the first data table, a data table that is not partitioned other than the first data table, and performs partition that is the same as that of the first data table according to a partition key that is of the selected data table and that is the same as that of the first data table. The same partition herein indicates that ranges range obtained by performing partition according to same partition keys are the same, until all data tables in the CP table set of the first data table are partitioned. For implementation details of a specific method for performing partition by the partitioning unit 33, refer to descriptions in Embodiments 1 and 2. Details are not described herein.

Figure 10:
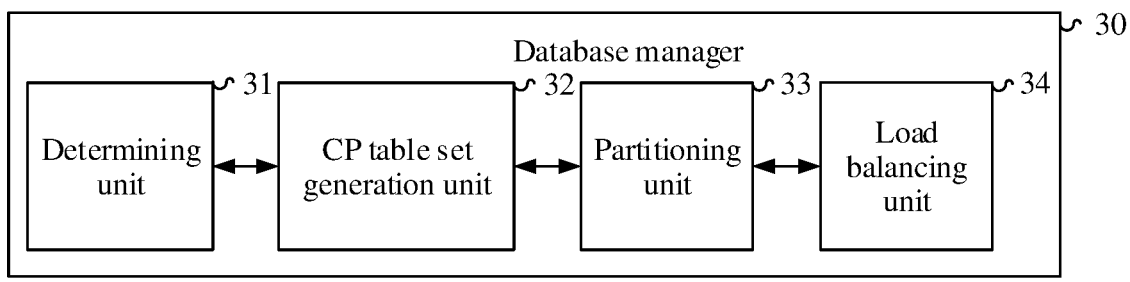
FIG. 10 is another structural diagram of the database manager according to Embodiment 4 of the present disclosure.

Further, FIG. 10 is another structural diagram of the database manager 30 according to Embodiment 4 of the present disclosure. Based on the database manager 30 in Embodiment 4 shown in FIG. 9, the database manager 30 shown in this embodiment of the present disclosure further includes a load balancing unit 34. The load balancing unit 34 is configured to receive a load balancing request, where the load balancing request indicates that load balancing needs to be performed on a first node, and determine, on the first node, a CP table set on which load balancing is to be performed, determine, in the CP table set on which load balancing is determined to be performed, a data table on which load adjustment is to be performed, select, from the data table on which load balancing is determined to be performed, a partition key for range adjustment, and perform, on all data tables that are in the CP table set on which load balancing is determined to be performed and that include the partition key selected for range adjustment and according to the partition key selected for range adjustment, range adjustment that is the same as that of the data table of the partition key selected for range adjustment.

For implementation details of a specific method for performing load balance adjustment by the load balancing unit 34, refer to descriptions in Embodiment 3. Details are not described herein.

Figure 11:
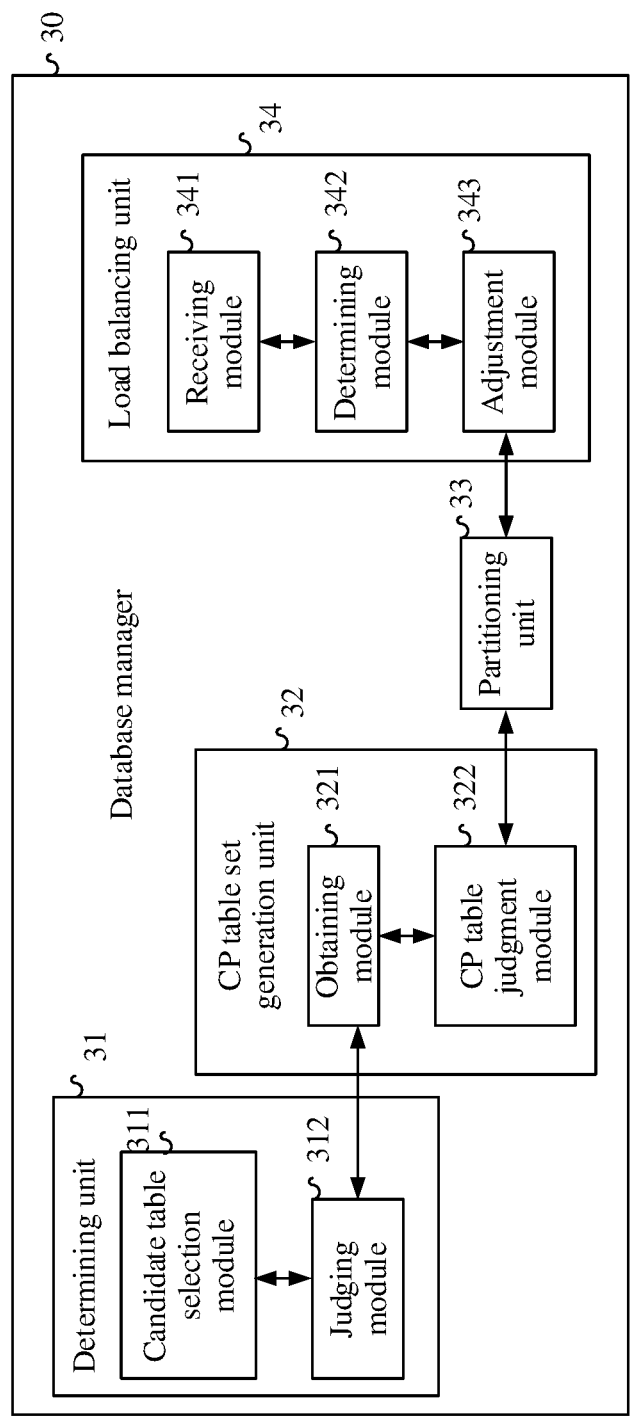
FIG. 11 is another structural diagram of the database manager according to Embodiment 4 of the present disclosure.

Optionally, FIG. 11 shows another structural diagram of the database manager 30 according to Embodiment 4 of the present disclosure. Based on the database manager 30 shown in FIG. 10, the determining unit 31 in this embodiment of the present disclosure includes a candidate table selection module 311 configured to select, from data tables requiring partition, a data table that is not partitioned as a candidate table of a first data table, and a judging module 312 configured to determine whether a partition key that is a foreign key of another data table exists in partition keys of the selected candidate table, set the candidate table as the first data table if no partition key that is a foreign key of another data table exists in the partition keys of the selected candidate table, or otherwise, set the other data table as a candidate table of the first data table, and continuously determine whether the other data table can be used as the first data table, until the first data table is determined. Certainly, if a partition key that is a foreign key of another table exists in the candidate table, but the other table is partitioned, the candidate table may still be used as the first data table.

Optionally, the CP table set generation unit 32 in the database manager 30 includes an obtaining module 321 configured to obtain a partition key of a data table and a dimension table associated with the partition key of the data table, and a CP table judging module 322 configured to determine whether each associated dimension table is a CP table of the first data table, and confirm that the associated dimension table is a CP table of the first data table if all partition keys of an associated dimension table are included in partition keys of the first data table, or otherwise, confirm that the associated dimension table is not a CP table of the first data table.

Optionally, the database manager 30 further includes a load balancing unit 34. The load balancing unit 34 includes a receiving module 341 configured to receive a load balancing request, where the load balancing request indicates that load balancing needs to be performed on a first node, and determine, on the first node, a CP table set on which load balancing is to be performed, a determining module 342 configured to determine, in the CP table set on which load balancing is determined to be performed, a data table on which load adjustment is to be performed, and select, from the data table on which load balancing is determined to be performed, a partition key for range adjustment, and an adjustment module 343 configured to perform, on all data tables that are in the CP table set on which load balancing is determined to be performed and that include the partition key selected for range adjustment and according to the partition key selected for range adjustment, range adjustment that is the same as that of the data table of the partition key selected for range adjustment.

Further, a method for determining, by the determining module 342, a CP table set on which load balancing is to be performed includes determining, according to a data table record quantity dimension or an occupied space dimension, a CP table set that is on the first node and on which load balancing needs to be performed.

For same parts between implementation details of functions of each part of the database manager 30 in this embodiment of the present disclosure and the foregoing Embodiments 1 and 2, refer to descriptions in the foregoing embodiments. Details are not described herein.

According to the database manager 30 in this embodiment of the present disclosure, when an association table in a distributed database is partitioned, first, an associated CP table needs to be found from data tables requiring partition, the CP table is partitioned using a same partition range according to an associated partition key, such that during an OLAP operation, it is only required to obtain data from a current node or data of an associated same range from another node, with no need to obtain an entire fact table, thereby improving performance of an entire system. In addition, when load adjustment is needed, the database manager 30 determines a data table requiring load balance adjustment and a related partition key, and performs partition of a same range on each associated CP table still according to an associated partition key. This can ensure load balancing between nodes, such that a system stably runs. In addition, ranges of partition performed, still according to the associated partition key, on associated CP tables on all nodes that have undergone load balancing are the same. Therefore, it is ensured that during an OLAP operation, it is only required to obtain data from a current node or data of an associated same range from another node, with no need to obtain an entire fact table, thereby improving performance of an entire system.

Figure 12:
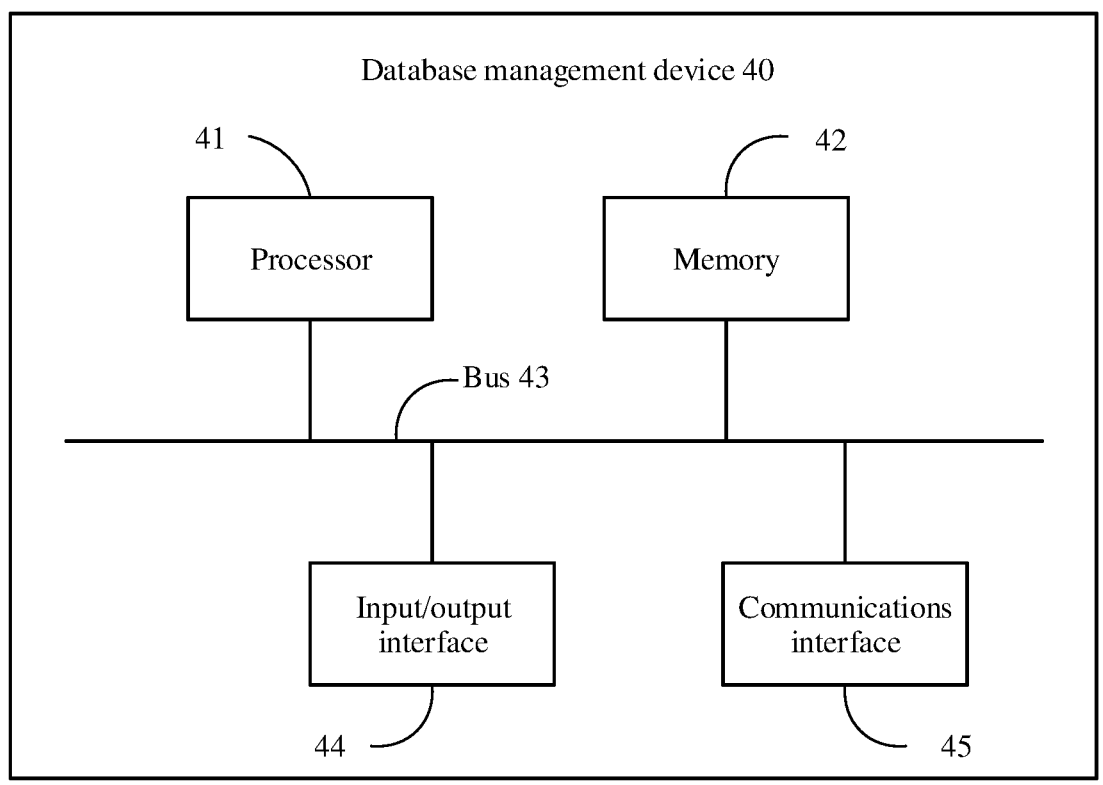
FIG. 12 is a structural diagram of a database management device according to Embodiment 5 of the present disclosure.

FIG. 12 schematically shows a database management device 40 according to Embodiment 5 of the present disclosure. As shown in FIG. 12, the database management device 40 includes a processor 41, a memory 42, and a bus 43. Communication connection between the processor 41 and the memory 42 is implemented using the bus 43.

The processor 41 may use a general-purpose central processing unit (CPU), a microprocessor, an application specific integrated circuit (ASIC), or one or more integrated circuits configured to execute a related program in order to implement the technical solution provided in this embodiment of the present disclosure.

The memory 42 may be a read only memory (ROM), a static storage device, a dynamic storage device, or a random access memory (RAM). The memory 42 may store an operating system and another application program. When the technical solution provided in this embodiment of the present disclosure is implemented using software or firmware, program code used to implement the technical solution provided in this embodiment of the present disclosure is stored in the memory 42, and is executed by the processor 41.

The memory 42 may be configured to store a computer execution instruction, or may be configured to store various types of information, such as a query result. The processor 41 may read, using the bus 43, information stored in the memory 42, or store a query result in the memory 42. In addition, when the database management device 40 runs, the processor 41 may read the computer execution instruction stored in the memory 42 in order to execute the methods for partitioning an association table in a distributed database described in Embodiments 1, 2, and 3.

Optionally, as shown in FIG. 12, the database management device 40 may further include an input/output interface 44 and a communications interface 45. The input/output interface 44 is configured to receive entered data and information, and output data such as an operation result.

The communications interface 45 uses a transceiver apparatus, for example, but not limited to, a transceiver in order to implement communication between the database management device 40 and another device or communications network.

The bus 43 may include a channel through which information is transmitted between parts (such as the processor 41, the memory 42, the input/output interface 44, and the communications interface 45) of the database management device 40.

A hardware structure shown in FIG. 12 and the foregoing descriptions are suitable for performing various methods for partitioning an association table in a distributed database provided in the embodiments of the present disclosure, such as Embodiments 1 and 2, and various method processes shown in FIG. 4 to FIG. 7. For brevity, details are not described herein.

It should be noted that for the database management device 40, although only the processor 41, the memory 42, the input/output interface 44, the communications interface 45, and the bus 43 are shown in FIG. 12, in a specific implementation process, a person skilled in the art should understand that, the database management device 40 further includes another component required for normal running. Furthermore, a person skilled in the art should understand that, according to a specific requirement, the database management device 40 may further include a hardware component that implements another additional function. In addition, a person skilled in the art should understand that the database management device 40 may include only components required for implementing the embodiments of the present disclosure, and does not need to include all components shown in FIG. 12.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software function unit and sold or used as an independent product, the integrated unit may be stored in a computer-readable storage medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation The computer-readable medium may include a RAM, a ROM, an electrically erasable programmable ROM (EEPROM), a compact disc ROM (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a FLOPPY DISK and a BLU-RAY DISC, where the disk generally copies data by a magnetic means, and the disc copies data optically by a laser means. The foregoing combination should also be included in the protection scope of the computer-readable medium. Based on such an understanding, the technical solutions of the present disclosure essentially, or the part contributing to the other approaches, or all or some of the technical solutions may be stored in a storage medium and includes several instructions for instructing a computer device (which may be a personal computer, a server, or a network device) to perform all or some of the steps of the methods described in the embodiments of the present disclosure.

In summary, what is described above is merely an example of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method for partitioning an association table in a distributed database, comprising:
    obtaining a plurality of first partition keys of a plurality of data tables requiring partition;
    determining a first data table in the data tables, wherein the first data table comprises a plurality of second partition keys, wherein each of the second partition keys is not a foreign key of a second data table, wherein the second partition keys are a subset of the first partition keys, and wherein the second data table is in the data tables and is different from the first data table;
    generating a colocation partition (CP) table set of the first data table based on the second partition keys, wherein the CP table set comprises the first data table and at least one CP table of the first data table, wherein the at least one CP table comprises a plurality of third partition keys, and wherein the third partition keys are a subset of the second partition keys;
    partitioning the first data table according to each of the second partition keys; and
    partitioning each of the at least one CP table in the CP table set, wherein a partition range of a partition key in the third partition keys is the same as a partition range of a corresponding partition key in the first data table.

2. The method of claim 1, wherein generating the CP table set of the first data table comprises:
    obtaining a first dimension table of the first data table, wherein the first dimension table comprises a plurality of fourth partition keys;
    determining whether each of the fourth partition keys is in the second partition keys;
    adding the first dimension table to the CP table set when each of the fourth partition keys is in the second partition keys;
    obtaining a second dimension table of the first dimension table, wherein the second dimension table comprises a plurality of fifth partition keys;
    determining whether each of the fifth partition keys is in the second partition keys; and
    adding the second dimension table to the CP table set when each of the fifth partition keys is in the second Partition keys.

3. The method of claim 2, further comprising not adding the first dimension table to the CP table set when each of the fourth partition keys is not in the second partition keys.

4. The method of claim 2, further comprising not adding the second dimension table to the CP table set when each of the fifth partition keys is not in the second partition keys.

5. The method of claim 1, further comprising:
    receiving a load balancing request indicating that load balancing needs to be performed on a first node;
    determining, on the first node, a second CP table set on which the load balancing is to be performed;
    determining, in the second CP table set, a third data table on which load adjustment is to be performed;
    selecting, from the third data table, a second partition key for partition range adjustment; and
    performing, on all data tables in the second CP table set comprising the second partition key, the partition range adjustment that is the same as that of the third data table.

6. The method of claim 5, wherein determining the second CP table set comprises determining, according to a data table record quantity, the second CP table set that is on the first node and on which the load balancing needs to be performed.

7. The method of claim 5, wherein determining the second CP table set comprises determining, according to occupied space, the second CP table set that is on the first node and on which the load balancing needs to be performed.

8. The method of claim 1, wherein a quantity of dimensions of partition ranges of each of the at least one CP data table is based on a quantity of partition keys of the at least one CP data table.

9. A database manager, comprising:
    a memory configured to store program instructions; and
    a processor coupled to the memory, wherein the program instructions cause the processor to be configured to:
        obtain a plurality of first partition keys of a plurality of data tables requiring partition;
        determine a first data table in the data tables, wherein the first data table comprises a plurality of second partition keys, wherein each of second partition keys is not a foreign key of a second data table, wherein the second partition keys are a subset of the first partition keys, and wherein the second data table is in the data tables and is different from the first data table;
        generate a colocation partition (CP) table set of the first data table based on the second partition keys, wherein the CP table set comprises the first data table and at least one CP table of the first data table, wherein the at least one CP table comprises a plurality of third partition keys, and wherein the third partition keys are a subset of the second partition keys;
        partition the first data table according to each of the second partition keys; and
        partition each of the at least one CP table in the CP table set, wherein a partition range of a partition key in the third partition keys is the same as a partition range of a corresponding partition key in the first data table.

10. The database manager of claim 9, wherein the program instructions further cause the processor to be configured to:
    obtain a first dimension table of the first data table, wherein the first dimension table comprises a plurality of fourth partition keys;
    determine whether each of the fourth partition keys is in the second partition keys;
    add the first dimension table to the CP table set when each of the fourth partition keys is in the second partition keys;
    obtain a second dimension table of the first dimension table, wherein the second dimension table comprises a plurality of fifth partition keys;

determine whether each of the fifth partition keys is in the second partition keys; and add the second dimension table to the CP table set when each of the fifth partition keys is in the second Partition keys.

11. The database manager of claim 10, wherein the program instructions further cause the processor to be configured to not add the first dimension table to the CP table set when each of the fourth partition keys is not in the second partition keys.

12. The database manager of claim 10, wherein the program instructions further cause the processor to be configured to not add the second dimension table to the CP table set when each of the fifth partition keys is not in the second partition keys.

13. The database manager of claim 9, wherein the program instructions further cause the processor to be configured to:

receive a load balancing request indicating that load balancing needs to be performed on a first node;

determine, on the first node, a second CP table set on which the load balancing is to be performed;

determine, in the second CP table set, a third data table on which load adjustment is to be performed;

select, from the third data table, a second partition key for partition range adjustment; and perform, on all data tables in the second CP table set comprising the second partition key, the partition range adjustment that is the same as that of the third data table.

14. The database manager of claim 13, wherein the program instructions further cause the processor to be configured to determine, according to a data table record quantity, the second CP table set that is on the first node and on which the load balancing needs to be performed.

15. The database manager of claim 13, wherein the program instructions further cause the processor to be configured to determine, according to occupied space, the second CP table set that is on the first node and on which the load balancing needs to be performed.

16. A database system, comprising:

a plurality of nodes, wherein each of the nodes is configured to maintain and manage a part of data; and a manager coupled to the nodes and comprising:
a memory configured to store program instructions; and
a processor coupled to the memory, wherein the program instructions cause the processor to be configured to:
obtain a plurality of first partition keys of a plurality of data tables requiring partition;
determine a first data table in the data tables, wherein the first data table comprises a plurality of second partition keys, wherein each of the second partition keys is not a foreign key of a second data table, wherein the second partition keys are a subset of the first partition keys, and wherein the second data table is in the data tables and different from the first data table;

generate a colocation partition (CP) table set of the first data table based on the first partition keys, wherein the CP table set comprises the first data table and at least one CP table of the first data table, wherein the at least one CP table comprises a plurality of third partition keys, and wherein the third partition keys are a subset of the second partition keys;

partition the first data table according to each of the second partition keys; and partition each of the at least one CP table in the CP table set, wherein a partition range of a partition key in the third partition keys is the same as a partition range of a corresponding partition key in the first data table.

17. The database system of claim 16, wherein the program instructions further cause the processor to be configured to:

obtain a first dimension table of the first data table, wherein the first dimension table comprises a plurality of fourth partition keys;

determine whether each of the fourth partition keys is in the second partition keys;

add the first dimension table to the CP table set when each of the fourth partition keys is in the second partition keys;

obtain a second dimension table of the first dimension table, wherein the second dimension table comprises a plurality of fifth partition keys;

determine whether each of the fifth partition keys is in the second partition keys; and add the second dimension table to the CP table set when each of the fifth partition keys is in the second partition keys.

18. The database system of claim 16, wherein the program instructions further cause the processor to be configured to:

receive a load balancing request indicating that load balancing needs to be performed on a first node;

determine, on the first node, a second CP table set on which the load balancing is to be performed;

determine, in the second CP table set, a third data table on which load adjustment is to be performed;

select, from the third data table, a second partition key for partition range adjustment; and perform, on all data tables in the second CP table set comprising the second partition key, the partition range adjustment that is the same as that of the third data table.

19. The database system of claim 18, wherein the program instructions further cause the processor to be configured to determine, according to a data table record quantity, the second CP table set that is on the first node and on which the load balancing needs to be performed.

20. The database system of claim 18, wherein the program instructions further cause the processor to be configured to determine, according to occupied space, the second CP table set that is on the first node and on which the load balancing needs to be performed.

* * * * *

UNITED STATES PATENT AND TRADEMARK OFFICE
CERTIFICATE OF CORRECTION

PATENT NO. : 10,831,737 B2
APPLICATION NO. : 15/814141
DATED : November 10, 2020
INVENTOR(S) : Tieying Wang, Zhe Liu and Ke Shen Page 1 of 1

It is certified that error appears in the above-identified patent and that said Letters Patent is hereby corrected as shown below:

In the Claims

Claim 2, Column 23, Line 61: "Partition keys." should read "partition keys."

Claim 10, Column 25, Line 4: "in the second Partition" should read "in the second partition"

Signed and Sealed this
Twenty-second Day of December, 2020

Andrei Iancu
*Director of the United States Patent and Trademark Office*